United States Patent [19]

O'Hara

[11] 4,046,714

[45] Sept. 6, 1977

[54] METHOD OF MANUFACTURING A HYDROREFINING CATALYST

[75] Inventor: Mark J. O'Hara, Mount Prospect, Ill.

[73] Assignee: UOP Inc., Des Plaines, Ill.

[21] Appl. No.: 719,885

[22] Filed: Sept. 1, 1976

Related U.S. Application Data

[63] Continuation-in-part of Ser. No. 588,561, June 19, 1975, abandoned.

[51] Int. Cl.² .................... B01J 29/06; B01J 23/13; B01J 23/64
[52] U.S. Cl. ................ 252/455 R; 252/465; 252/470
[58] Field of Search ............ 252/455 R, 470, 465, 252/458, 459, 472

[56] References Cited

U.S. PATENT DOCUMENTS

| 3,312,635 | 4/1967 | Liquori | 252/470 |
| 3,746,661 | 7/1973 | O'Hara | 252/455 R |
| 3,752,776 | 8/1973 | Chester et al. | 252/470 X |
| 3,855,153 | 12/1974 | Chang | 252/470 |

*Primary Examiner*—Carl F. Dees
*Attorney, Agent, or Firm*—James R. Hoatson, Jr.; Robert W. Welch; William H. Page, II

[57] ABSTRACT

An improved method of preparing a catalyst comprising a Group VIII metal and a Group VIB metal component impregnated on a refractory inorganic oxide support or carrier material, said catalyst being especially useful in the hydrorefining of petroleum hydrocarbon fractions and particularly effective for the conversion of sulfurous components contained therein. A more active catalyst results from the use of an impregnating solution comprising an anionic complex of a Group VIB and a Group VIII metal.

12 Claims, No Drawings

METHOD OF MANUFACTURING A HYDROREFINING CATALYST

CROSS-REFERENCE TO RELATED APPLICATIONS

This is a continuation-in-part of a copending application Ser. No. 588,561, filed June 19, 1975 now abandoned.

This invention relates to the manufacture of a catalytic composite particularly adapted to the hydrodesulfurization of petroleum hydrocarbon fractions. The catalytic composite herein contemplated comprises a Group VIII metal component and a Group VIB metal component impregnated on a refractory inorganic oxide support of carrier material —a catalytic composite which has been widely recognized for its capacity to convert sulfurous compounds contained in petroleum hydrocarbon fractions at hydrorefining conditions.

Although directed principally toward the destructive removal of sulfurous compounds contained within a hydrocarbon charge stock, the catalytic composites of this invention may be utilized to great advantage, as a direct result of their inherent hydrogenation activity, in the preparation of substantially saturated charge stocks. The charge stocks suitable for processing in accordance with the present invention will be readily recognized by those possessing expertise in the field of petroleum processing. However, a brief discussion of applicable charge stocks is believed warranted. In general, petroleum fractions and/or distillates are divided into various categories determined by their overall boiling range. Depending upon various refinery demands, as well as the particular locale in which the final product is to be utilized, the boiling ranges of the various distillates will vary individually, and may even overlap in some instances. For example, the gasoline or naphtha boiling range is generally considered to include pentanes and heavier hydrocarbons boiling up to an end boiling point of about 200° to about 220° C., with intermediate fractions being designated as "light naphtha" or "heavy naphtha". The kerosene boiling range commonly has an initial boiling point of from about 150° to about 220° C. and an end boiling point of from about 260° to about 315° C. Light gas oils, therefore, generally have an initial boiling point of from 260° to about 315° C. and an end boiling point of about 400° to about 425° C., while heavy gas oils boil from about 400° to an end boiling point of about 565° C. In recent years, interest has been generated with respect to the desulfurization of still higher-boiling hydrocarbonaceous material commonly referred to as "black oils". These are generally characterized as containing a considerable quantity of non-distillable material which would normally boil above a temperature of about 565° C. In general, the degree of contamination, particularly with respect to sulfurous compounds, increases as the content of higher-boiling material increases. Thus, a heavy vacuum gas oil will generally contain a greater quantity of the sulfurous contaminants than does a naphtha fraction.

It is an object of this invention to present an improved method of manufacturing a catalyst comprising a Group VIII and a Group VIB metal component impregnated on a refractory inorganic oxide support or carrier material, said improvement resulting in a catalyst of improved activity, particularly with respect to the conversion or sulfurous components contained in petroleum hydrocarbon fractions.

In one of its broad aspects, the present invention embodies an improvement in the manufacture of a catalyst comprising a Group VIB and a Group VIII metal component impregnated on a refractory inorganic oxide carrier material wherein said carrier material is impregnated with an aqueous solution of a Group VIB metal compound and a Group VIII metal compound and thereafter dried and calcined, said improvement comprising impregnating said carrier material with an aqueous solution comprising an anionic complix of a Group VIB and a Group VIII metal sufficient to provide a final catalyst product containing from about 5 to about 20 wt. % Group VIB metal, and with a simple salt of a Group VIII metal sufficient in combination with said anionic complex to provide a final catalyst product containing from about 0.1 to about 10 wt % Group VIII metal.

Other objects and embodiments of this invention will become apparent in the following detailed specification.

The refractory inorganic oxides herein contemplated are such as are commonly utilized as a support or carrier material for catalytically active metals to produce a catalytic composite thereof. Said refractory inorganic oxides include alumina, silica, zirconia, titania, magnesia, thoria, boria, and the like, and also composites thereof, for example, alumina-silica, alumina-zirconia, etc. The refractory inorganic oxide can be employed as a powder, but more practically as pills, pellets, granules, extrudates, spheres, or other suitable shape or form. The refractory inorganic oxide may be prepared in a desired shape, for example, by commingling the powdered form thereof with a binder and/or lubricant and compressing the mixture into pills or pellets of uniform size and shape. Alternatively, the powdered refractory inorganic oxide can be commingled with a peptizing agent such as nitric acid to form an extrudable dough, the dough being subsequently pressured through orifices of predetermined size. The resulting extruded material may be cut or broken into uniform or random lengths to yield extrudate particles suitable for use, or the extruded material may be cut or broken into uniform or random lengths to be balled by the marumerizing technique to produce spheroidal particles, the product in each case being subsequently calcined. One preferred method of preparing spheroidal refractory inorganic oxide particles is in the utilization of the well-known oil-drop method. For example, an alumina sol, suitably prepared by digesting aluminum in hydrochloric acid, with or without a silica sol commingled therewith, is dispersed as droplets in a hot oil bath whereby gelation occurs with the formation of spheroidal particles. In this type of operation, the silica is set thermally, the alumina being set chemically utilizing ammonia as a neutralizing or setting agent. Usually the ammonia is furnished by an ammonia percursor which is included in the sol. The ammonia precursor is suitably urea, hexamethylenetetramine, or mixtures thereof. Only a fraction of the ammonia percursor is hydrolyzed or decomposed in the relatively short period during which initial gelation occurs. During the subsequent aging process, the residual ammonia percursor retained in the spheroidal gel particles continues to hydrolyze and effect further polymerization of the sol whereby desirable pore characteristics of the product are established. The particles are aged, usually for a period of from about 10 to about 24 hours at a predetermined temperature, usually from about 50° to about 105° C. and at a predetermined pH value. The aging time is substantially reduced utilizing pressure aging techniques.

As previously stated, and as heretofore disclosed in the art, the foregoing method affords a convenient means of developing desired physical characteristics of the carrier material. Thus, one skilled in the art will appreciate that in general the aluminum/chloride ratio of the alumina sol will influence the average bulk density of the product and, correspondingly, the pore volume-pore diameter characteristics attendant therewith, lower ratios tending toward higher average bulk densities. Other process variables effecting physical properties of the carrier material include the time, pH and temperature at which the particles are aged. Usually, temperatures in the lower range and shorter aging periods tend toward higher average bulk densities.

In any case, the refractory inorganic oxide is dried and calcined prior to impregnation with the Group VIII and Group VIB metal component. Calcination is suitably accomplished on heating the carrier material in an oxygen-containing atmosphere, such as air, at a temperature increasing from about 125° to about 600° C. over a period of from about 30 to about 90 minutes, and thereafter at a temperature of from about 600° to about 650° C. for at least about 30 minutes and not necessarily in excess of about 8 hours.

It is the usual practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at a temperature effecting decomposition of said compound, the desired metallic component is formed, deposited and dispersed on the carrier material. The catalyst of this invention is prepared to contain metallic components comprising a metal of Group VIII and Group VIB. The present invention is based on the discovery that a hydrorefining catalyst of increased activity, particularly with respect to hydrodesulfurization, is produced when at least a portion of said components in impregnated on the carrier material as an anionic complex comprising said components in combination. Included in the compounds which furnish the desired anionic complex in aqueous solution are those available from Climax Molybdenum Company, for example, ammonium 5-molybdocobaltate (III): $(NH_4)_6[Co_2Mo_{10}O_{36}] \cdot xH_2O$ ammonium 6-molybdocobaltate (III): $(NH_4)_3[CoMo_6O_{24}H_6] \cdot xH_2O$ ammonium 6-molybdonickelate (II): $(NH_4)_4[NiMo_6O_{24}H_6] \cdot xH_2O$ ammonium 9-molybdonickelate (IV): $(NH_4)_6[NiMo_9O_{32}] \cdot xH_2O$ and the like, as well as the corresponding chromium and tugsten compounds. Preferably, substantially all of the Group VIB metal component is derived from the anionic complex, with the balance of the required Group VIII metal component being provided by a simple salt of a Group VIII metal, for example, nickel nitrate, nickel sulfate, nickel chloride, nickel acetate, nickel formate, cobaltous nitrate, cobaltous sulfate, cobaltous chloride, ferric chloride, ferric nitrate, ferric sulfate, ferric formate, ferric acetate, chloroplatinic acid, chloropalladic acid, palladium chloride, etc. The Group VIII metal component which is preferably cobalt or nickel, is effective in an amount comprising from about 0.1 to about 10 wt. % of the final catalyst composite, and the concentration of the selected Group VIII metal compound in the aqueous inpregnating solution is sufficient to provide a desired amount of the Group VIII metal within the give range.

The Group VIB - Group VIII anionic complex and the Group VIII metal salt may be impregnated on the carrier material simultaneously from a common impregnating solution, or separately and in any desired sequence. The impregnation process may be effected utilizing conventional techniques whereby the carrier material is soaked, suspended, dipped one or more times, or otherwise immersed in an impregnating solution at conditions to adsorb a soluble percursor compound of a desired catalytic component on the surface thereof. Certain impregnating techniques have been found to be particularly favorable to promote desirable physical properties in the finished catalyst product. Thus, impregnation of the Group VIB and Group VIII metal components is preferably effected utilizing a minimal volume of impregnating solution commensurate with an even distribution of the catalytic components on the carrier material. One preferred method involves the use of a steam-jacketed rotary dryer. The carrier material is immersed in the impregnating solution contained in the dryer and the carrier material tumbled therein by the rotating motion of the dryer, the volume of the carrier material so treated being initially in the range of about 0.7 to about 1.0 with respect to the volume of impregnating solution. Evaporation of the solution in contact with the carrier material is expedited by applying steam to the dryer jacket. The evaporation is further facilitated by a continuous purge of the dryer utilizing a flow of gas, suitably air or nitrogen. In any case, the impregnating solution is preferably evaporated at conditions to reduce the volatile matter of the impregnated carrier material to less than about 50 wt. % as determined by the weight loss on ignition at 50° C. The impregnated carrier material is preferably calcined in an oxygen-containing atmosphere at a temperature from about 425° to about 815° C. in accordance with prior art practice, usually for a period of from about 1 to about 8 hours or more.

Hydrorefining, particularly directed to the conversion of sulfurous compounds in a residual oil, is generally effected at reaction conditions including an imposed hydrogen pressure of from about 100 to about 1000 psi. Normally, the hydrogen is charged together with recycle hydrogen to provide from about 1000 to about 5000 standard cubic feet per barrel of hydrocarbon charge. Reaction conditions further include an elevated temperature, usually from about 95° to about 425° C., although temperatures in the higher range, say from about 315° to about 425° C. are most suitable. Also, the sulfur-containing residual oil is typically processed at a liquid hourly space velocity of from about 1.0 to about 20.

The activity of the catalyst prepared in accordance with the method of this invention was determined relative to that of a standard or reference catalyst. The standard or reference catalyst employed herein consisted of 2.7 wt. % cobalt and 9.0 wt. % molybdenum supported on 1/16 inch alumina spheres. The catalyst had an ABD of 0.58 grams per cubic centimeter. The relative activity was determined with respect to the desulfurization of a vacuum gas oil feed stock as a function of the reciprocal liquid hourly space velocity. The feed stock boiled in the 295°-575° C. range, at an API at 15° C. of 19.8°, and contained 2.65 wt. % sulfur. The activity of the standard or reference catalyst had been previously established at 1, 2, and 3 liquid hourly spaced velocities, the sulfur content of the liquid product being in each case plotted on semi-logarithmic scale as a function of the reciprocal space velocity to establish a straight-line reference curve. The ratio of the liquid hourly space velocity required of the reference catalyst to achieve the same sulfur conversion as the test catalyst at about 2 liquid hourly space velocity, multiplied by a factor of 100, is then taken as the relative activity of the test catalyst — the liquid hourly spaced velocity of the reference catalyst being taken from the reference curve. It will be appreciated that a test catalyst with a relative activity in excess of 100 is more active than the standard or reference catalyst. In establishing the reference curve, and in the activity test, 70 cubic centimeters of catalyst interspersed with 28 c.c. 60-80 mesh sand was disposed in a ⅜inch ID tubular reactor as a fixed bed 8 ¾inches in depth, the bed being preceded by a preheater section 21 ¼inches in depth and comprising quartz chips. The reactor is pressured to 750 psig with hydrogen, and the hydrogen recycled over the catalyst as the inlet temperature is raised to 260° C. over a three-hour period. The feed stock is thereafter charged to the reactor together with 1800 SCF/bbl recycle hydrogen while catalyst inlet temperature is raised to 385° C. over a four-hour period. After a ten-hour line-out at this temperature, the reactor effluent is collected over a two-hour test period and, after another line-out period of six hours, again collected over a two-hour test period. The reactor effluent from the two test periods is then analyzed for sulfur. Immediately thereafter, the inlet temperature is raised to 395° C. and the test procedure repeated at this temperature substantially as described.

The following examples are presented in illustration of the method of catalyst preparation of this invention and are not intended as an undue limitation on the generally broad scope of the invention as set out in the appended claims.

EXAMPLE I

A spheroidal carrier material with a surface area of about 225 m²/gm, an average pore diameter of about 100 A, and an average pore volume of about 0.57 cc/gm, and comprising 90 wt. % alumina and 10 wt. % silica, was impregnated with cobalt and molybdenum utilizing ammonium 5-molybdocobaltate (III) as the sole source of cobalt and molybdenum. Thus, approximately 24 gms of ammonium 5-molybdocobaltate (III) was dissolved in 120 mls of water at about 75° C. in a rotary steam dryer. About 100 gms of the alumina-silica spheres were immersed and tumbled in the solution for about an hour while the solution was evaporated to dryness. The dried spheres were subsequently heated to 538° C. over an hour's time and then calcined in air for 1.5 hours at 538°-565° C. The catalyst contained 1.15 wt. % cobalt and 9.3 wt. % molybdenum, and had an average bulk density of about 0.75 gms/cc. The relative activity of the catalyst of this example, hereinafter referred to as Catalyst A, was 60.

EXAMPLE II

About 150 gms of the spheroidal alumina-silica carrier material was impregnated with cobalt and molybdenum in accordance with conventional methods to yield a catalyst containing about 1.15 wt. % cobalt and 9.3 wt. % molybdenum as in the catalyst of Example I. In this instance, the impregnation solution was prepared by commingling an aqueous solution of 27.8 gms of 90.7% molybdic acid and 50 mls of ammonium hydroxide with an aqueous solution of 10.3 gms of cobalt nitrate hexahydrate, the resulting solution being subsequently diluted to 190 mls with water. The spheres were immersed in the solution in a rotary steam dryer, an tumbled therein as the solution was evaporated to dryness. The impregnated spheres were thereafter heated to about 538° C. over an hour's time, and then calcined in air for about 1.5 hours at 538°-565° C. The catalyst thus prepared had a relative activity of less than 50. The catalyst of this example is hereinafter referred to as Catalyst B.

EXAMPLE III

A spheroidal carrier material with a surface area of about 227 m²/gm, an average pore diameter of about 100 A, and an average pore volume of about 0.57 cc/gm, and comprising 90 wt. % alumina and 10 wt. % silica, was impregnated with molybdenum and cobalt pursuant to the method of the present invention. Thus, 22 grams of ammonium 5-molybdocobaltate (III) was dissolved in 120 mls of water at about 75° C. in a rotary steam dryer. About 9.7 gms of $Co(NO_3)_2 \cdot 6H_2O$ was added to the solution, and about 100 gms of the spheres were immersed therein. The spheres were then tumbled in the solution for about an hour while the solution was evaporated to dryness. The dried spheres were thereafter heated to about 538° C. over an hour's time and then calcined in air for about 1.5 hours at 538°-565° C. The catalyst contained ;b 2.7 wt. % Co and 9.0 wt. % Mo, and had an average bulk density of 0.77 grams per cubic centimeter. The catalyst of this example, hereinafter referred to as Catalyst C, had a relative activity of 188.

EXAMPLE IV

In this example, 150 grams of the spheroidal alumina-silica carrier material of Example I was impregnated with molybdenum and cobalt in accordance with prior art practice. The impregnating solution was prepared by commingling an aqueous solution of 26.9 gms of 90.7% $MoO_3$ and 50 mls of ammonium hydroxide with an aqueous solution of 24.2 gms of cobalt nitrate hexahydrate, the solution being subsequently diluted to 190 mls with water. The spheres were immersed in the impregnating solution in a rotary steam dryer, and tumbled therein as the solution was evaporated to dryness. The spheres were thereafter heated to 538° C. over an hour's time, and then calcined in air for about 1.5 hours at 538°-565° C. The catalyst contained 2.7 wt. % Co and 9.0 wt. % Mo, and had an average bulk density of 0.76 gms/cc. The relative activity of this catalyst was 143. The catalyst of this example is hereinafter referred to as Catalyst D.

TABLE I

| Catalyst | A | B | C | D |
|---|---|---|---|---|
| Co, wt. % via complex | 1.15 | — | 1.1 | — |
| Co, wt. % via salt | — | 1.15 | 1.6 | 2.7 |
| Co, wt. % total | 1.15 | 1.15 | 2.7 | 2.7 |
| Mo, wt. % via complex | 9.3 | — | 9.0 | — |
| Mo, wt. % via salt | — | 9.3 | — | 9.0 |
| Mo, wt. % total | 9.3 | 9.3 | 9.0 | 9.0 |
| Relative Activity | <60 | <50 | 188 | 143 |

The above-tabulated data clearly illustrates the improvement resulting from the practice of the present invention. It is apparent that, when the cobalt component is derived solely from the cobalt-molybdenum anionic complex as in Catalyst A, the catalyst is substantially more active than is the case when said component is derived solely from a simple salt of cobalt as in Catalyst B, Catalysts A and B containing the same weight percentages of the cobalt and molybdenum components.

It is further apparent that, when the cobalt component is derived in part from the cobalt-molybdenum anionic complex and in part from a simple salt of cobalt pursuant to this invention as in Catalyst C, the catalyst is surprisingly substantially more active than is the case when said component is derived solely from the cobalt-molybdenum anionic complex as in Catalyst A, or solely from a simple salt of cobalt as in Catalysts B and D.

I claim as my invention:

1. In the manufacture of a hydrorefining catalyst comprising a Group VIB and a Group VIII metal component impregnated on a refractory inorganic oxide carrier material wherein said carrier material is impregnated with an aqueous solution of a Group VIB metal compound and a Group VIII metal compound and thereafter dried and calcined, the improvement which comprises impregnating said carrier material with an aqueous solution comprising an anionic complex of a Group VIB and a Group VIII metal sufficient to provide a final catalyst product containing from about 5 to about 20 wt. % Group VIB metal, and with a simple salt of a Group VIII metal sufficient in combination with said anionic complex to provide a final catalyst product containing from about 0.1 to about 10 wt. % Group VIII metal.

2. The improvement of claim 1 further characterized in that said carrier material comprises alumina.

3. The improvement of claim 1 further characterized in that said carrier material comprises alumina composited with silica in a weight ratio of from about 3:1 to about 9.5:1.

4. The improvement of claim 1 further characterized in that said anionic complex comprises molybdenum.

5. The improvement of claim 1 further characterized in that said anionic complex comprises cobalt.

6. The improvement of claim 1 further characterized in that said anionic complex comprises nickel.

7. The improvement of claim 1 further characterized in that said aqueous solution comprising an anionic complex of a Group VIB metal and a Group VIII metal is an aqueous ammonium 5-molybdocobaltate (III) solution.

8. The improvement of claim 1 further characterized in that said aqueous solution comprising an anionic complex of a Group VIB metal and a Group VIII metal is an aqueous ammonium 6-molybdocobaltate (III) solution.

9. The improvement of claim 1 further characterized in that said aqueous solution comprising an anionic complex of a Group VIB metal and a Group VIII metal is an aqueous ammonium 6-molybdonickelate (II) solution.

10. The improvement of claim 1 further characterized in that said aqueous solution comprising an anionic complex of a Group VIB metal and a Group VIII metal is an aqueous ammonium 9-molybdonickelate (IV) solution.

11. The improvement of claim 1 further characterized in that said simple salt of a Group VIII metal is cobalt nitrate.

12. The improvement of claim 1 further characterized in that said simple salt of a Group VIII metal is nickel nitrate.

* * * * *